March 9, 1971 — E. F. PERRIN — 3,568,351
FISH ATTRACTER WITH BAIT ACTIVATOR
Filed Jan. 17, 1969
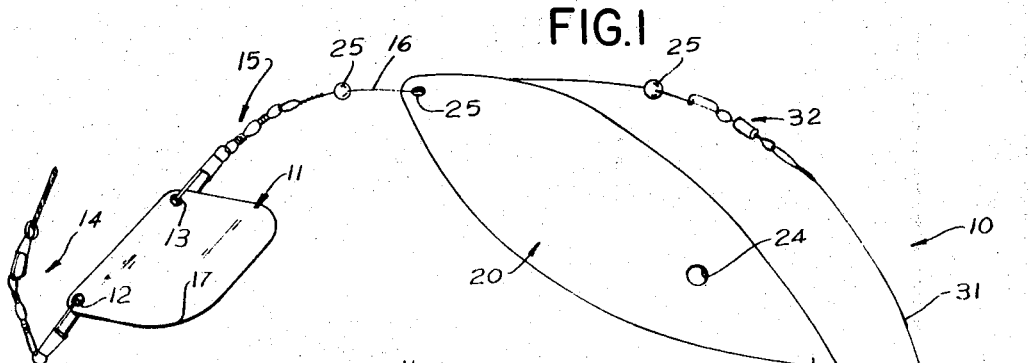
FIG.1
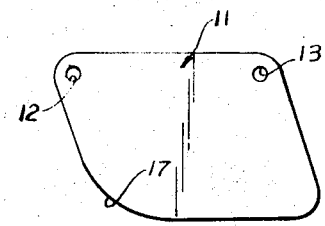
FIG.2
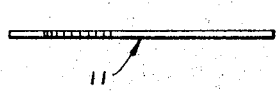
FIG.3
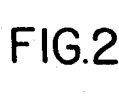
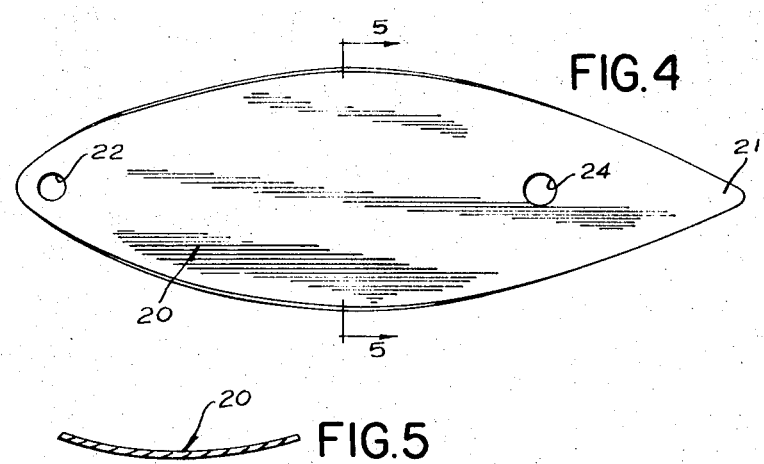
FIG.4
FIG.5
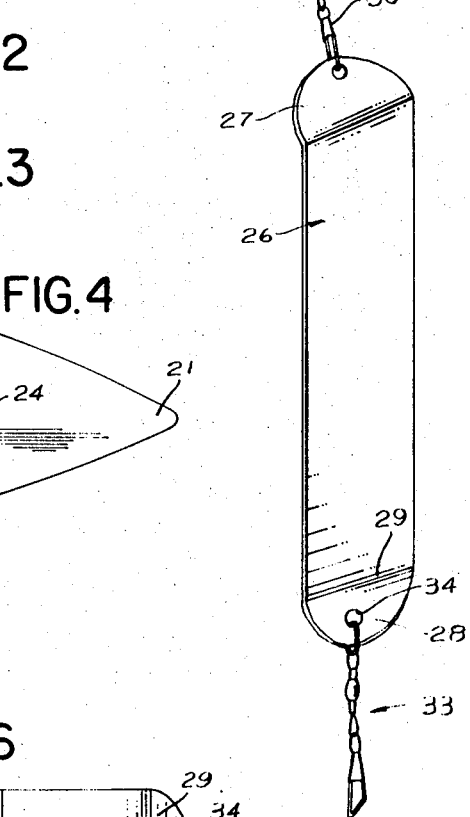
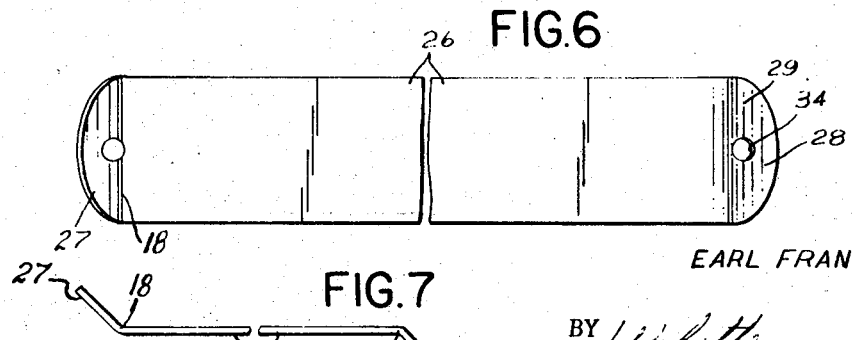
FIG.6
FIG.7
INVENTOR
EARL FRANK PERRIN
BY
ATTORNEYS

United States Patent Office 3,568,351
Patented Mar. 9, 1971

3,568,351
FISH ATTRACTER WITH BAIT ACTIVATOR
Earl Frank Perrin, Perrin's Landing, Rte. 3,
Traverse City, Mich. 49684
Filed Jan. 17, 1969, Ser. No. 791,918
Int. Cl. A01k 85/04
U.S. Cl. 43—17.1          2 Claims

ABSTRACT OF THE DISCLOSURE

An attracter and activator comprising, in order along its elongated overall extent, three appropriately plated components, i.e., a leading rudder or keel member, an intermediate blade having a sonic hole, and a rear activator blade having oppositely bent leading and trailing ends. These components are flexibly articulated by steel leader, swivel and snap members, including steel snaps at the front and rear of the lure at which a trolling line and a hook are connected.

BACKGROUND OF THE INVENTION

(1) Field of the invention

The fish attracter and bait activator lure obviously has application in the sport of fishing and, more specifically the trolling branch of that diversion, and the component rudder, intermediate blade and activator thereof have particular advantage in imparting a desired measure of stability in action, coupled with diverse motions and sonic effect designed to lure and hook a fish.

(2) Description of the prior art

The most pertinent prior patents of which I am aware are Clark, No. 3,090,153 of May 21, 1963 and Knill, No. 1,609,090 of Nov. 30, 1926. These references individually disclose certain keel and plate members having a degree of similarity to members of the present lure; however, I am unaware of any disclosure, patented or otherwise, of the assembly of articulated special elements making up the lure of my invention.

SUMMARY OF THE INVENTION

The improved attracter and activator generally comprises a leading keel member which is swivel and snap connected to the fishline, being of a roughly parallelogram or irregular diamond-shaped outline; an intermediate plate of elongated oval outline, in a measure reflecting the outline of a minnow or small fish, being of mildly curved cross section for active movement in respect to a steel leader element upon which it swivels; and a trailing activator plate which is generally oblong and elongated in nature, having reversely bent forward and rear ends to impart lateral action, a hook or hook gang being attachable by a snap swivel connection to the tail of this part.

BRIEF DESCRIPTION OF THE DRAWING

FIG. 1 is a perspective view of the attracter and activator lure as a whole;

FIG. 2 is a side elevational view of its rudder or keel plate;

FIG. 3 is an edge view of this plate;

FIG. 4 is a view in side elevation of the intermediate plate or blade component of the lure;

FIG. 5 is a view in transverse section on line 5—5 of FIG. 4;

FIG. 6 is a side elevational view, partially broken away, of the terminal activator plate or blade component; and FIG. 7 is an edge elevational view of the last named part.

DESCRIPTION OF A PREFERRED EMBODIMENT

As shown in assembly in FIG. 1, a leading component of the improved lure, which is generally designated by the reference numeral 10, is a rudder or keel plate or blade member 11 which, as best appears in FIGS. 2 and 3, is flat throughout and of an outline describable as being roughly a parallelogram or a distorted, irregular diamond. Rudder 11 has apertures 12, 13 adjacent its top leading and trailing rounded corners, at the former of which a known type of line-attached swivel and snap connector, generally designated 14, is applied. The hole or aperture 13 similarly receives another snap and swivel 15, to the swivel end of which a steel lead wire 16 of intermediate length is attached. As shown in FIG. 2, the obtuse lower front angle of the rudder element 11 is mildly rounded at 17 to cut smoothly through the water.

Rudder 11 is stiff in nature, being about 2" in overall length and fabricated of a bright nickel-plated steel, although other materials are contemplated.

An intermediate blade or plate component 20 (see FIGS. 4 and 5 in conjunction with FIG. 1) is of an elongated relatively narrow oval outline, pointed at its rear end 21 and in general simulating the appearance of a relatively large minnow. It is mildly upwardly (FIG. 5) concave in cross section at its approximate front-to-rear midpoint; and adjacent its leading end it is provided with an aperture 22 of substantial size encircling the steel connector or leader 16, so that it is capable of a very loose wobbling action relative to the latter, not only about the axis of the leader but about its own front-to-rear axis.

A distinctive feature of the intermediate plate or blade component 20 is that it carries, somewhat adjacent its tail 21, a relatively large sonic hole 24, through which water may rush when the lure is trolled, to create a degree of turbulence in this zone, as well as to audibly attract the prey to the extent that this is possible. In order to impart a degree of attractive color, as well as to end-restrain blade 20, the connector lead 16 fixedly carries a pair of bright red beads 25. It is contemplated that member 20 be of approximately 1¾" width x 5" overall length, being of a relatively thin gauged chromed metal, as compared with the thicker and more stable structure of rudder member 11.

An elongated, parallel edged, strip-like activator plate or blade 26 is the final plate component of the lure. It, like intermediate member 20, is of relatively thin, chrome finished metal being, say, 1" x 6" overall length. It is flat throughout, with the exception of rounded forward and trailing ends 27, 28, respectively, which are bent in opposite directions from the general plane of member 26, as along parallel transverse bends 18, 29 (FIGS. 6 and 7); and a snap connector 30, elongated wire lead 31 and snap and swivel connector means 32 articulate the activator component 26 with the rear of the intermediate bead-carrying leader 16.

The terminal activator 26, as trolled, has a quite violent flapping and spinning action in the water, quite different from the action of intermediate sonic blade member 20. The result is that these members have proved very effective in attracting fish to a single or gang hook applied to a rear end swivel and snap connection 33, which is secured to a hole 34 in the tail 28 of the lure.

Coupled with the agitative and attractive action of lure 10, in the respects lent thereto by the contouring of members 20 and 26, is the stabilizing rudder or keel effect of the leading member 11, which operates to maintain the lure as a whole in a more or less straight line trailing the trolling craft.

What is claimed is:

1. A fishing lure comprising an assembly of forward rudder, intermediate and trailing blade members flexibly articulated in front-to-rear progression by a pair of elongated connectors, each of said forward rudder, intermediate and trailing blade members having a different geometrically shaped outline, the forward member being flat throughout and having an outline in the form of a parallelogram with rounder corners, said forward member having upper and lower edge portions and leading and trailing edge portions, a pair of openings on the upper edge portion of said forward member, one of said openings being adjacent the leading edge portion and the other of said openings being adjacent the trailing edge portion, said one opening at the leading edge portion of said forward member being adapted to be connected to a trolling line, one of said elongated connectors being attached to said forward member through said other opening at the trailing edge portion, said forward member being proportioned and mounted relative to the trolling line for a stable travel through the water, the intermediate member being of mildly arcuate cross-section and having an elongated relatively narrow oval outline, as defined between convex edges, said intermediate member having an opening at one end thereof through which said one elongated connector extends whereby said intermediate member is capable of a very loose wobbling action relative to said one elongated connector, and the trailing member being flat and elongated and having elongated parallel edges, said trailing member at its front and rear end portions being curved and oppositely bent from an otherwise flat condition, and an opening in the front end portion, the other of said elongated connectors being attached to said trailing member through the opening in said front end portion, said rear end portion being adapted to be connected to a hook.

2. The lure of claim 1, in which said intermediate member has a sonic hole between said convex edges.

References Cited
UNITED STATES PATENTS

| | | | |
|---|---|---|---|
| 1,444,338 | 2/1923 | Doering | 43—42.5X |
| 2,637,134 | 5/1953 | Davidson | 43—42.5X |
| 2,740,226 | 4/1956 | Arff | 43—43.13X |
| 3,056,228 | 10/1962 | Stackhouse | 43—42.51 |
| 3,090,153 | 5/1963 | Clark | 43—43.13 |
| 3,432,957 | 3/1969 | Marino | 4—42.06X |

SAMUEL KOREN, Primary Examiner

D. J. LEACH, Assistant Examiner

U.S. Cl. X.R.

43—42.06, 42.18, 42.31, 42.5, 43.13